United States Patent [19]
Shu et al.

[11] Patent Number: 5,920,682
[45] Date of Patent: Jul. 6, 1999

[54] MULTIPLE LAYER CLUSTER DITHER MATRIX FOR REDUCING ARTIFACTS IN PRINTED IMAGES

[75] Inventors: Joseph Shu, San Jose; Andrei Pascovici, Mountain View; Chia-Hsin Li, San Jose, all of Calif.

[73] Assignee: Seiko Epson Corporation, Tokyo, Japan

[21] Appl. No.: 08/717,508

[22] Filed: Sep. 20, 1996

[51] Int. Cl.[6] .............................. G06F 15/00; H04N 1/40; H04N 1/46
[52] U.S. Cl. ....................... 395/109; 358/456; 358/457; 358/459; 358/534; 358/535; 358/536
[58] Field of Search ..................... 358/501, 502, 358/503, 523, 534, 298, 429, 454, 455, 456, 457, 459, 466, 535, 536; 395/109

[56] References Cited

U.S. PATENT DOCUMENTS

| | | | |
|---|---|---|---|
| 4,196,454 | 4/1980 | Warren | 358/283 |
| 4,339,774 | 7/1982 | Temple | 358/283 |
| 4,345,313 | 8/1982 | Knox | 364/515 |
| 4,449,150 | 5/1984 | Kato | 358/283 |
| 4,668,995 | 5/1987 | Chen et al. | 358/282 |
| 5,124,803 | 6/1992 | Troxel | 358/298 |
| 5,166,809 | 11/1992 | Surbrook | 358/456 |
| 5,173,745 | 12/1992 | Hanse | 356/350 |
| 5,377,024 | 12/1994 | Dillinger | 358/502 |
| 5,416,612 | 5/1995 | Ingraham et al. | 358/501 |
| 5,438,431 | 8/1995 | Ostromoukhovc | 358/457 |
| 5,463,703 | 10/1995 | Lin | 382/251 |
| 5,469,515 | 11/1995 | Lin | 358/457 |
| 5,473,446 | 12/1995 | Perumal, Jr. et al. | 358/523 |
| 5,477,305 | 12/1995 | Parker et al. | 358/456 |
| 5,489,991 | 2/1996 | McMurray | 358/456 |
| 5,526,438 | 6/1996 | Barton | 358/457 |
| 5,588,094 | 12/1996 | Kroon | 395/109 |
| 5,594,839 | 1/1997 | Shu | 395/109 |
| 5,617,123 | 4/1997 | Takaoka et al. | 358/298 |
| 5,689,344 | 11/1997 | Ebner | 358/298 |

*Primary Examiner*—Edward L. Coles
*Assistant Examiner*—Mark Wallerson
*Attorney, Agent, or Firm*—Michael T. Gabrik

[57] ABSTRACT

A technique for reducing image artifacts is described. The technique includes utilizing a clustered-dot dither matrix having a plurality of layers with each of the layers arranged in one of a plurality of complementary patterns within the dither matrix. By using a dither matrix which generates layers of dots in complementary patterns, image banding artifacts and ink bleeding characteristics resulting from a printer generating a halftone image using a clustered-dot dithering technique are reduced.

22 Claims, 6 Drawing Sheets

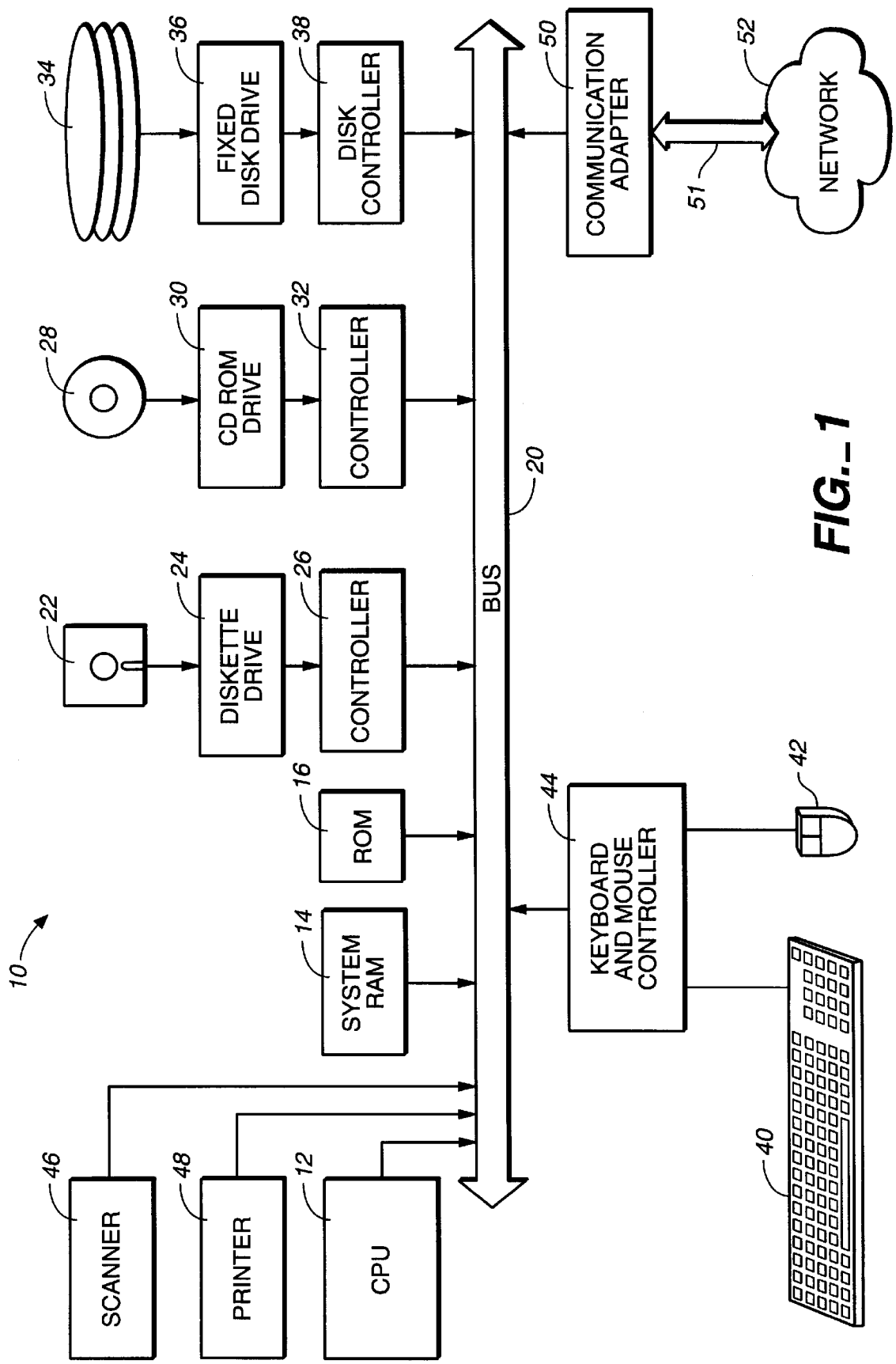
FIG._1

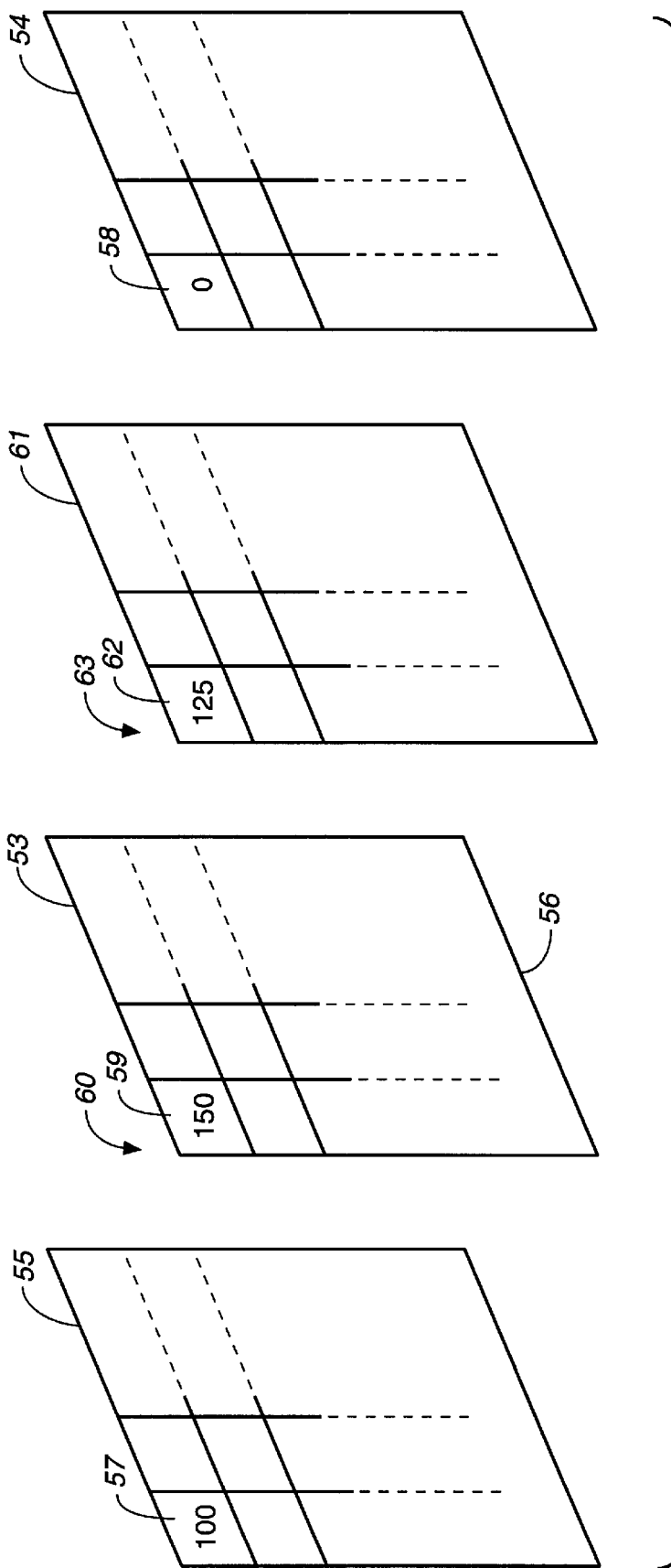
FIG._2

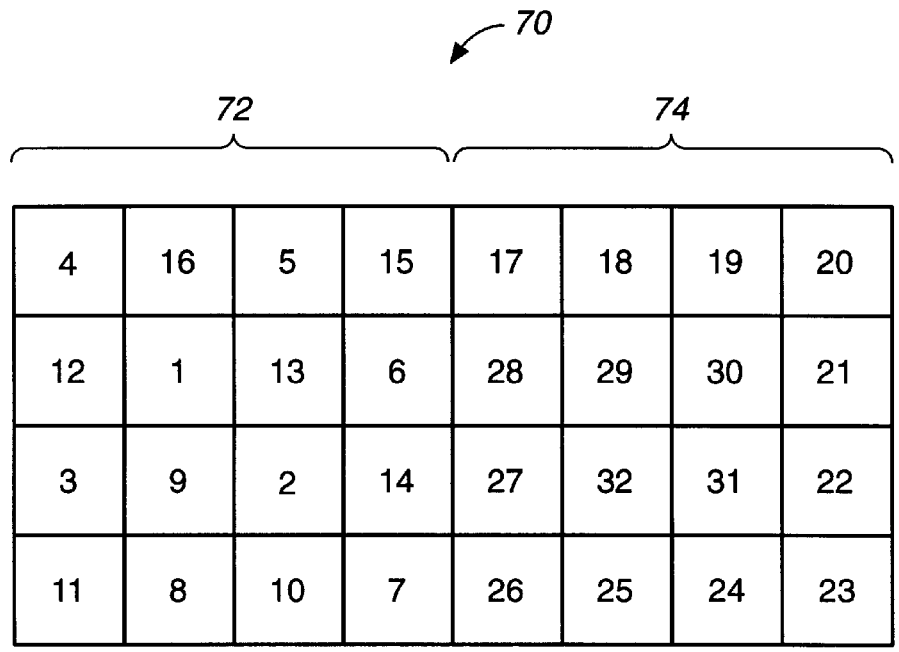
FIG._3
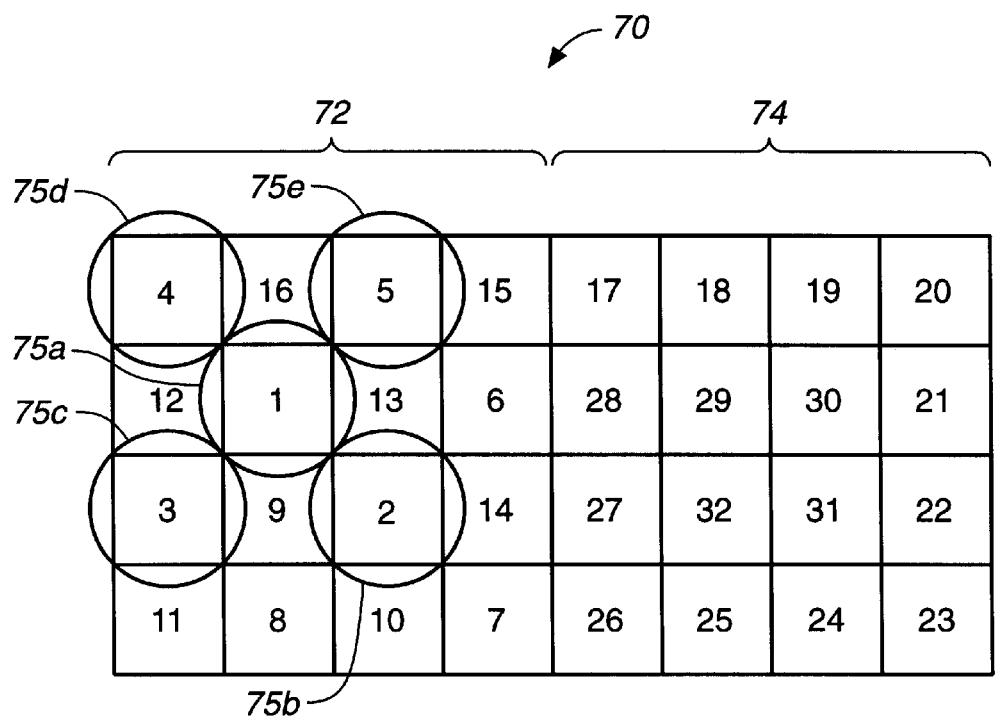
FIG._3A

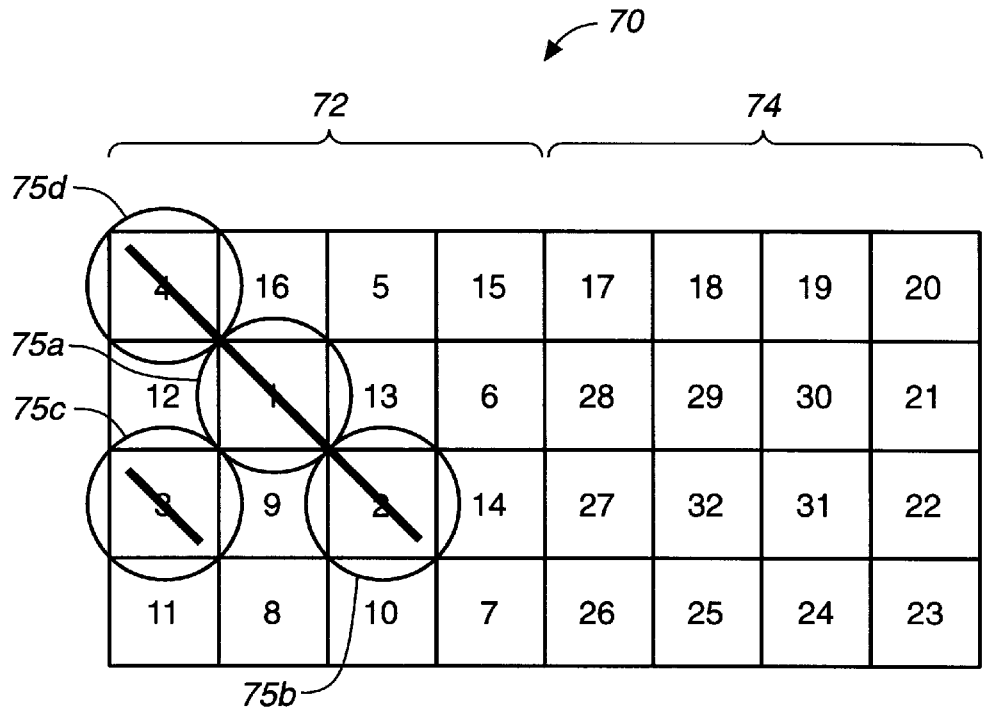
FIG._3B
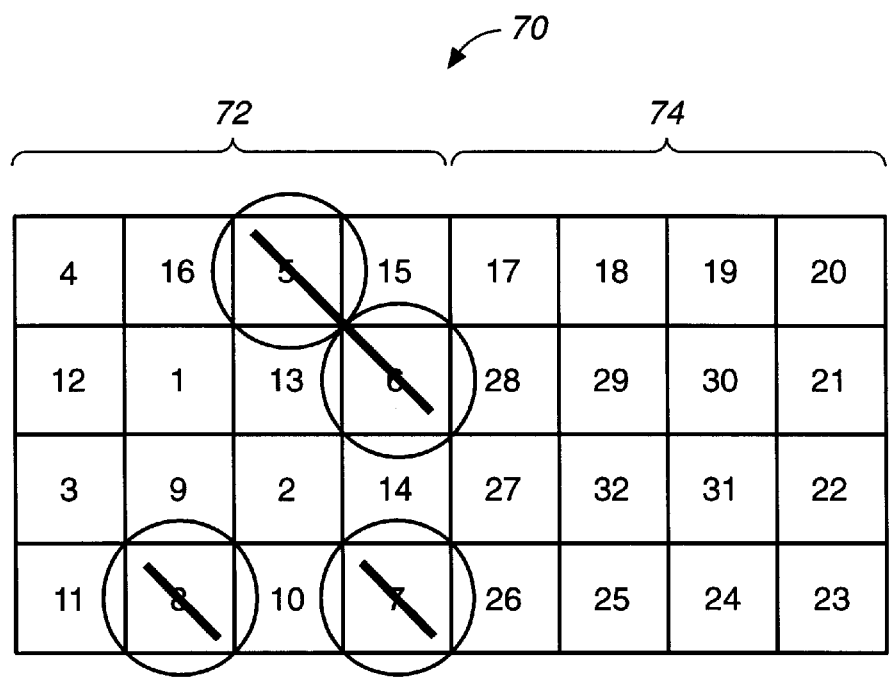
FIG._3C

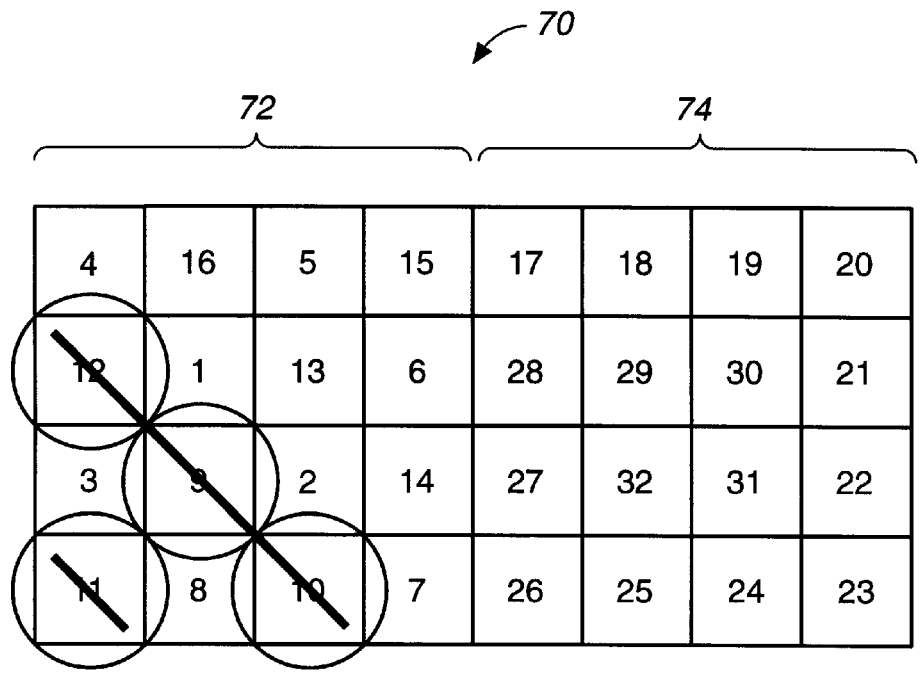
FIG._3D
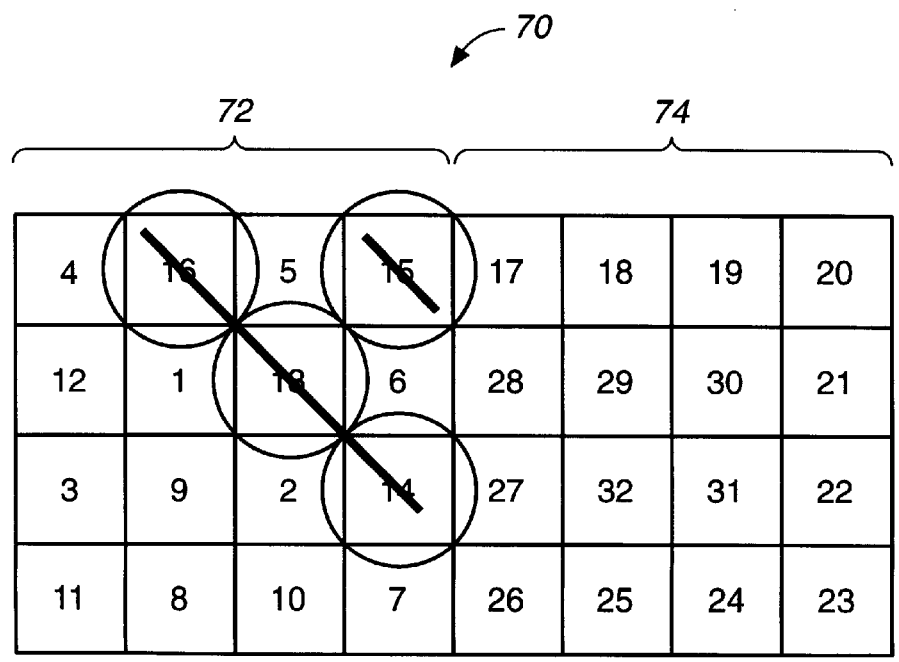
FIG._3E

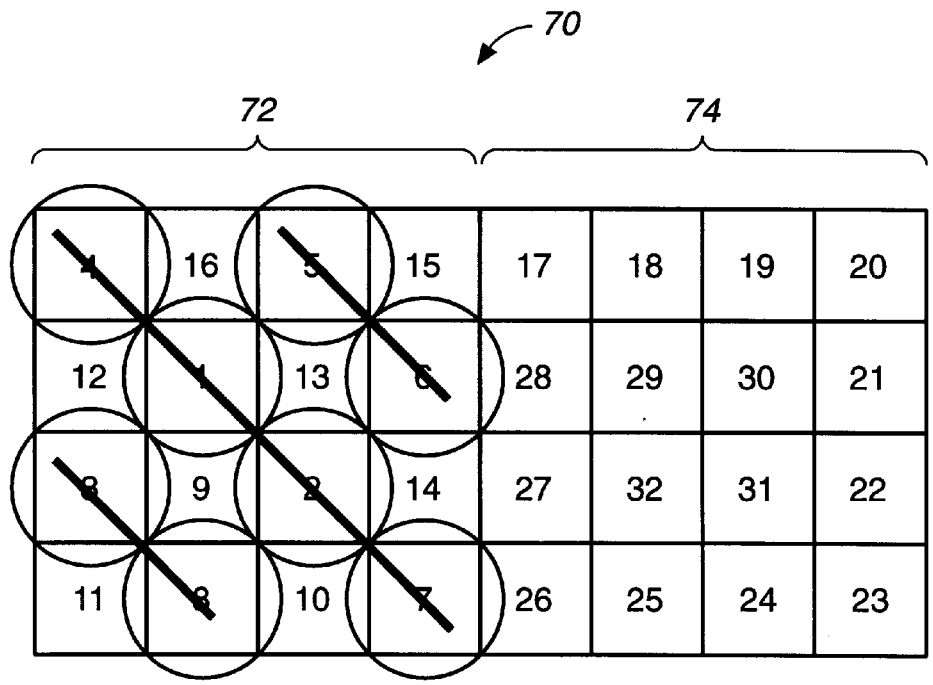
FIG._3F
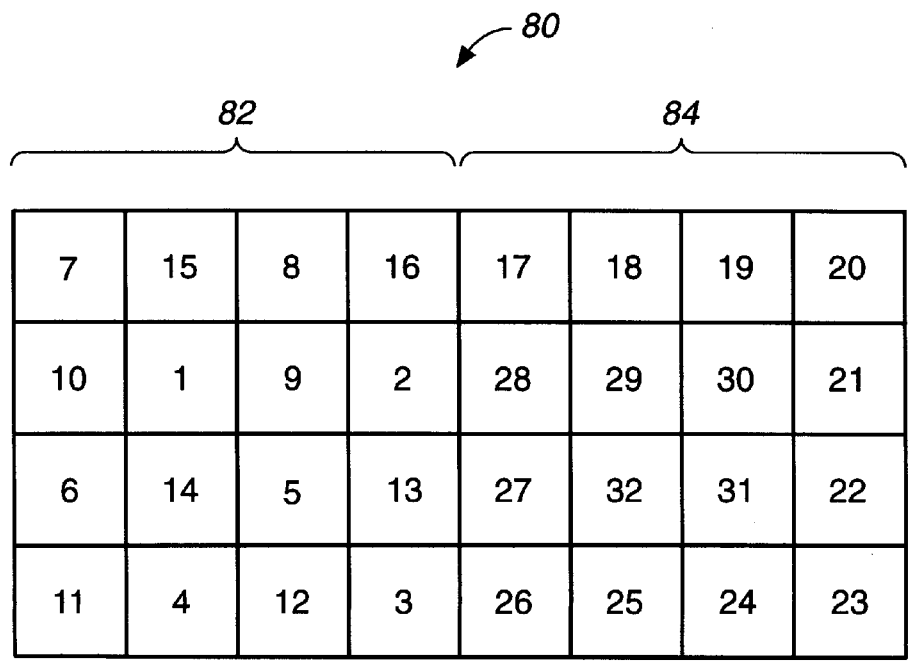
FIG._4

MULTIPLE LAYER CLUSTER DITHER MATRIX FOR REDUCING ARTIFACTS IN PRINTED IMAGES

FIELD OF THE INVENTION

The present invention relates generally to printing and more particularly to methods and apparatus for reducing image artifacts.

BACKGROUND OF THE INVENTION

As is known in the art, a digital color image can be stored or expressed as three-dimensional values of picture elements ("pixels") that in combination form the image. Each pixel value corresponds to a location in a color space which represents a particular color. Often used color spaces include a so-called red-green-blue (RGB) color space and a so-called cyan-magenta-yellow (CMY) color space. In the RGB color space, each pixel is provided from combinations of red, green and blue pixel components or pixel vectors having predetermined magnitudes. The red, green and blue pixel components are thus combined to provide the pixel having a particular color. Similarly in the CMY color space each pixel is provided from combinations of cyan, magenta and yellow pixel components having predetermined magnitudes which are combined to provide the pixel having a particular color.

Image processing systems typically represent each pixel component with a predetermined number of bits. For example, each pixel component may be represented by eight bits. In this case each pixel component may be assigned one of $2^8$ or 256 possible values. In such a case, each pixel component can have a value between 0 and 255 for example.

Ink jet printers typically print by disposing a plurality of like-sized ink dots on a recording media such as paper. The ink dots are placed on the recording media in locations corresponding to pixel locations in the image. The printer is binary in the sense that the ink dot is either applied or not applied to the recording medium at any given pixel location. Intensity levels and colors in an original image which cannot be directly produced by binary printers are simulated in printed images using a technique generally referred to as half-toning.

In a halftoning technique, colors and intensities different from that which a printer can directly provide are produced by applying printer-ink dots in different percentages of the pixels. In ordered dither-type half-toning, threshold values of a dither matrix are associated with respective display-medium pixel locations and the printer deposits ink on a recording medium at image locations at which the pixel component value equals or exceeds the associated threshold value of the dither matrix. Thus, if the dither matrix includes threshold values which are more or less evenly distributed throughout a range (e.g. 0–255), a pixel component having a value in the middle of the range (e.g. a value of 128) to results in a dot of ink having a color associated with that pixel component being deposited at approximately one-half of the pixel locations. Similarly, a pixel component having a value near or at the top of the range of threshold values (e.g. a value of 255) typically results in a dot of ink having a color associated with that pixel component being deposited in all pixel locations at that region of the image. When dots are deposited in all locations of an image, ink is said to be deposited with a 100% ink duty. A 100% Ink duty represents the maximum per unit area quantity of ink that can be deposited on a recording media.

As is also known, in a clustered-dot dithering method, dots are clustered in patterns. Thus, a cluster dot typically includes multiple printer ink dots. Cluster dot size is increased by printing a first ink dot at an initial point defined by a dither matrix and printing subsequent ink dots in a spiral pattern emanating from the initial point.

One problem which arises when printing using the conventional clustered-dot dither approach is that since the ink-dots are closely spaced, portions of adjacent printer dots overlap. Furthermore, close inspection of such printer ink dots reveals that when horizontally or vertically adjacent dots are printed at maximum ink duty limits, overlapping regions of the dots correspond to local regions within the cluster dot where ink bleeding occurs. Ink bleeding refers to deposition of a quantity of ink on the recording media which is greater than the amount of ink the recording media can absorb and the resultant flow of ink away from the area in which the excessive amount of ink was deposited.

For example, if it is desired to print ink dots of cyan, magenta and yellow color to thus produce a black dot, a 100% ink duty cannot be used for each pixel component color because the total ink duty, and thus the amount of ink disposed on the recording medium, will typically be greater than that which the recording medium can reasonably absorb. This results in ink running or bleeding on the recording medium.

In addition to the above-mentioned ink duty limit problem, the spiral pattern in which the ink dots are deposited on the recording medium to form the cluster dots also results in consecutively printed ink dots having portions which overlap. For example, in conventional cluster dot dithering, when four dots are printed they are arranged in a square pattern and overlap at a point which is located at the center of the four dots. In a case where only four dots out of a possibility of sixteen dots are printed, for example, no violation of a total ink duty limit of the image region occurs because only four dots out of sixteen dots have been printed. The image, however, can appear relatively noisy to a viewer due to bleeding. This noisy image appearance is due, at least in part to, the excessive amounts of ink and the ink dot overlap problem.

In ink jet printers printing with conventional clustered-dot dithering techniques, the overlapping problem is amplified for at least two reasons. First, the printer ink dots are often larger than a corresponding space which the ink dots are ideally suited to fill. Second, dot overlap occurs because ink dots disposed on the recording media tend to spread or expand in size upon impact with the recording media. The amount by which the dots expand depends upon a variety of factors including paper quality (e.g. glossy paper vs. non glossy paper), ink composition, etc . . . Dot spreading results in further overlap of adjacent dots and is further exacerbated by depositing excessive amounts of ink on the recording media.

Moreover, imperfect horizontal printer alignment or registration also results in ink dot overlap. The overlapped regions of the dots appear in the image as dark or light bands typically referred to as banding artifacts. Thus, an image printed using a clustered dot dithering technique is susceptible to banding artifacts caused by overlap of proximate printer dots and due to a variety of factors including printer registration problems. The bleeding and banding artifacts are especially noticeable to a human viewing the image when the image includes regions having ink dots printed with a relatively low ink duty (i.e. an ink duty in the range of 0% to about 25% ink duty).

Printer misregistration is typically caused by mechanical tolerances and inaccuracies in the electromechanical design and/or manufacture of the printer. One particular cause of misregistration are the inaccuracies of the printer gearbox and drive mechanisms, including pulleys, belts, worn gears and lead screws. The variations in the gear operation produce different frequencies of banding.

To avoid or minimize the occurrence of the aforementioned image artifacts, the printer must accurately position dots on the recording medium to produce regularly spaced cluster dots. However, while the misregistration can be improved by improving mechanical tolerances in both printer components and assembly of the printer components, this is typically costly both in the design and the manufacturing processes. Thus, due to the inability of the printers to provide perfect registration in horizontal and vertical directions, the printer cannot position the printer dots in the cluster in precisely the correct location which results in the printed image having artifacts.

When portions of adjacent printer dots overlap do to the printer mis-registration, the printer dots are said to be "torn apart" or "sheared." When cluster dots are sheared, changes in the intensity of the image result, due at least in part, to the overlapping of some cluster dots and the large spacing between other cluster dots. This is especially noticeable in those regions of a printed image in which ink duty limits of about 25% or less are used. Thus, shearing results in the printed image having banding artifacts.

Thus, even if the recording media could absorb the ink disposed thereon by the printer, due to the printer registration problem, the banding artifacts would be particularly noticeable if each ink were allowed to be deposited with a 100% ink duty. Conversely, even if a delivery mechanism (e.g. a print head) could accurately stop at every $1/720$ inch position, for example, the printer ink dot would still spread over a relatively large area of the recording media causing adjacent dots to overlap resulting in the imaging having the aforementioned banding artifacts and bleeding characteristics. Thus, the ink bleeding and printer registration problems are intertwined.

It would therefore be desirable to provide a technique for reducing the banding artifacts resulting from a printer generating a halftone image using a clustered-dot dithering technique. It would also be desirable to reduce the ink bleeding in images.

SUMMARY OF THE INVENTION

In accordance with the present invention, an apparatus for generating a halftone image from a source image represented as an array of pixel values stored in a source image memory includes a threshold value memory having a first array of threshold values stored therein with each of the threshold values grouped into a plurality of layers. The relative locations of the threshold values which make up each of the layers are arranged to form complementary diagonal patterns within the array of threshold values. The apparatus further includes a comparator, coupled to the source image memory and the threshold value memory and a halftone image generator. The comparator compares each of the pixel values stored in the source image memory with a corresponding one of the threshold values stored in the threshold value memory and the halftone image generator constructs a pattern of dots arranged in a pattern defined by the layers of the threshold value memory. With this particular arrangement, an apparatus for reducing image banding artifacts resultant from the back and forth motion of a printer head is provided. By grouping the threshold values in the threshold value memory to form a plurality of layers, consecutively printed ink dots in a cluster dot are spaced by distances which minimize the amount of overlap between successively printed dots in the dither matrix. Furthermore, since the dot spacing provided by the layer approach reduces the amount of overlap between consecutively printed dots, the number of localized regions of over inking and ink bleeding on the recording medium is reduced. In a preferred embodiment, the layers are selected in accordance with a required ink duty level.

In accordance with a further aspect of the present invention, a method of producing a halftone image from a digital data file includes the step of generating a pattern of dots for each of a plurality of colors wherein the pattern in which the dots are applied to the recording media varies as a function of the input density of each of the plurality of colors. The generating step includes the steps of generating a first layer of a clustered-dot dither matrix which forms a first diagonal pattern of the clustered-dot dither matrix and generating a second layer of the clustered-dot dither matrix, the second layer generating a second diagonal pattern in the clustered-dot dither matrix. In one embodiment, the diagonal pattern defined by the second layer is complementary to the diagonal pattern defined by the first layer. With this particular arrangement, a technique for reducing image artifacts resultant from printer misregistration is provided. By providing a dither matrix having a plurality of layers each of which defines a diagonal pattern, consecutively printed ink dots in each layer are spaced by distances which minimize the amount of overlap between consecutively printed dots in a cluster dot. Furthermore, the dot spacing provided by the diagonal layer approach reduces the number of localized regions of over inking and ink bleeding on the recording medium. In a preferred embodiment, the dots in each layer are selectively printed in accordance with a required ink duty. In one embodiment, the method further includes the steps of determining the ink duty of an image region and printing dots in a first layer of the clustered-dot dither matrix in response to the ink duty value. In this manner the layers are selectively applied according to an ink duty value. This tends to reduce the occurrences of localized regions of over inking in image regions and reduces the noisy appearance of images in which ink is applied at a relatively low ink duty.

In accordance with a still further aspect of the present invention, a computer program product for producing a halftone image from a digital data file includes a computer usable medium having stored thereon computer readable program code to generate a pattern of dots for each of a plurality of colors wherein the pattern of dots varies as a function of the input density of each of the plurality of colors, a computer usable medium having threshold values of a clustered-dot dither matrix stored thereon, the clustered-dot dither matrix having a plurality of matrix cells with first ones of the plurality of matrix cells forming a first layer of the clustered-dot dither matrix and second ones of the plurality of matrix cells forming a second layer of the clustered-dot dither matrix and wherein first ones of the matrix cells in the first layer lie along a diagonal axis of the clustered-dots dither matrix and first ones of the matrix cells of the second layer lie along a second different diagonal axis of the clustered-dot dither matrix. The computer program product further includes a computer usable medium having stored thereon computer readable program code to compare values from the digital data file to threshold values of corresponding matrix cells in the first layer of the clustered-dot dither matrix and a computer usable medium having computer readable program code to compare values from the digital data file to values of corresponding matrix cells in the second layer of the clustered-dot dither matrix. With this particular arrangement, a computer program which allows printing of color images having reduced image artifacts and ink bleeding characteristics is provided.

In accordance with a still further aspect of the present invention, a technique for reducing banding artifacts resultant from the back and forth motion of a printer head includes the steps of dividing an image into one or more pixel regions and dividing each of the one or more pixel regions into a plurality of layers. Each of the layers include a plurality of points spaced by predetermined distances. An initial point of a first layer is defined and initial points defined on each of the subsequent layers are offset from the initial point of the first layer by a predetermined amount and in a predetermined direction. The layers are applied in a predetermined order in response to an ink duty value to generate a desired dot shape and size.

In accordance with a still further aspect of the present invention, a clustered-dot dither matrix includes a plurality of layers with each of the layers arranged in one of a plurality of complementary diagonal patterns within the dither matrix. By using a dither matrix which generates dots in a diagonal pattern, image banding artifacts and ink bleeding characteristics resulting from a printer generating a halftone image using a clustered-dot dithering technique are reduced.

BRIEF DESCRIPTION OF THE DRAWINGS

The foregoing features of the invention, as well as the invention itself may be more fully understood from the following detailed description of the drawings, in which:

FIG. 1 is a block diagram of a computer system suitable for use with the present invention;

FIG. 2 is an diagrammatically view of a halftone image generated with a clustered-dot dither matrix;

FIG. 3 is a clustered-dot dither matrix having layers in which cluster dots are diagonally arranged;

FIG. 3A is a clustered-dot dither matrix having dots disposed in a portion of the first layer;

FIGS. 3B–3E show layers one through 4 of a clustered-dot dither matrix;

FIG. 3F is a diagrammatically view of dots disposed in layers one and two of a clustered-dot dither matrix; and FIG. 4 is a clustered-dot dither matrix having layers in which cluster dots are spaced by one cell.

DESCRIPTION OF THE PREFERRED EMBODIMENTS

Referring now to FIG. 1, a computer system 10 on which the invention may be implemented is shown. Computer system 10 may be provided, for example, as an IBM compatible computer or an equivalent computer system, such as the types sold by Seiko Epson. The exemplary computer system 10 of FIG. 1 is for descriptive purposes only. Although the description may refer to terms commonly used in describing particular computer systems, the description and concepts equally apply to other systems, including systems having architectures dissimilar to FIG. 1.

Computer system 10 includes a central processing unit (CPU) 12, which may be provided, for example, as a conventional microprocessor, a random access memory (RAM) 14 for temporary storage of information, and a read only memory (ROM) 16 for permanent storage of information. Each of the aforementioned components are coupled to a bus 20. Operation of computer system 10 is generally controlled and coordinated by operating system software. The operating system software controls allocation of system resources and performs tasks such as processing, scheduling, memory management, networking, and I/O services, among things. Thus, an operating system resident in system memory and running on CPU 12 coordinates the operation of the other elements of computer system 10.

Also coupled to bus 20 is a non-volatile mass storage device which may be provided as a diskette 22. Diskette 22 is insertable into a diskette drive 24 which is, in turn, coupled to bus 20 by a controller 26. Similarly, a compact disc (CD) ROM 28 is insertable into a CD ROM drive 30 which is, in turn, coupled to bus 20 by a controller 28. A hard disk 34 is typically provided as part of a fixed disk drive 36 which is coupled to bus 20 by a disk controller 38.

Data and software may be provided to and extracted from computer system 10 via removable storage media such as diskette 22 and CD ROM 28. For example, data values generated using techniques to be described below in conjunction with FIGS. 2–5 may be stored on storage media similar to media 22, 28. The data values may then be retrieved from the media 22, 28 by CPU 12 and utilized by CPU 12 to perform color printing of images. Alternatively, CPU 12 may simply store such data values in ROM 16. Alternatively still, computer software useful for printing images on color printing peripherals may be stored on storage media similar to media 22, 28. Such computer software may be retrieved from media 22, 28 for immediate execution by CPU 12. CPU 12 may retrieve the computer software and subsequently store the software in RAM 14 or ROM 16 for later execution.

User input to computer system 10 may be provided by a number of devices. For example, a keyboard 40 and a mouse 42 are coupled to bus 20 by a controller 44. A scanner 46 which may be provided, for example, as a hand held scanner or a page scanner is coupled to bus 20. Scanner 46 is capable of scanning color images which may later be printed by a color printer 48 also coupled to the bus 20.

Printer 48 may be provided, for example, as an ink jet printer. It should be noted that printer 48 may itself include a processor and a memory to which the CPU provide electrical signals which control printer functions.

In system 10, the processor 12 provides printer signals to the printer 48 and in response to the printer signals fed thereto, the printer 48 generates a printed page. The printed page may, for example, correspond to a page of text or alternatively the printed page may correspond to an image. When printer 48 is provided as a color printer, the image may be provided as a color image.

Printer 48 can produce halftone images or gray scale images on a recording media such as paper. For a halftone image, each pixel of the image either has a symbol printed or not printed. For gray scale image, each symbol on a pixel is further refined to have one of many gray levels.

A halftone image is usually easier and computationally less expensive to generate than a gray scale image. Thus, many relatively low cost printers are especially designed to print halftone images.

To print a halftone image, a continuous tone image is divided into a plurality of image regions each of which includes a plurality of pixels. Each of the pixels in the source image has a value. The plurality of pixels in the image regions form a so-called source image. The source image is then transformed into a halftone image using one of a plurality of different transformation techniques.

One transformation technique for transforming a source image to a halftone image is a so-called dithering technique which utilizes a so-called dither matrix. The dither matrix represents a physical space corresponding to a portion of the source image and includes a plurality of matrix elements each of the matrix elements having a predetermined value. The values of each of the matrix elements in the dither matrix are compared to or mapped over corresponding image regions of the source image. For a source image that is larger than the space represented by the dither matrix, the dither matrix is replicated to cover the entire source image. The value of each element in the dither matrix is thus compared to a value of a corresponding pixel in the source image. If the value of the pixel in the source image is greater than the value stored in the corresponding matrix element of the dither matrix, a symbol will be printed in a position of the halftone image corresponding to the position of the pixel in the source image.

In order to generate a visually pleasing halftone image using the above technique, the values of the matrix elements in the dither matrix are selected to avoid the appearance of artifacts in the halftone image while providing a halftone image which is relatively close in appearance to the source image. The values stored in the matrix elements of the dither matrix are preferably not generated by a random number generator since a fully random pattern would result in generation of a halftone image having an appearance which is not as similar as possible to the source image.

In an ordered dither technique the values stored in the dither matrix correspond to a deterministic, periodic array of threshold values. The threshold values are thus said to be ordered rather than random.

Ordered dithering techniques can be divided into two classes by the nature of the dots produced. The first class is referred to as clustered-dot dither and the second class is referred to as dispersed dot dither. Thus, printer 48 represents one example of a system that uses clustered-dot dither techniques.

Computer system 10 also includes a communications adaptor 50 which allows the system to be interconnected to a local area network (LAN) or a wide area network (WAN), schematically illustrated by bus 51 and network 52. Thus, data and computer program software can be transferred to and from computer system 10 via adapter 50, bus 51 and network 52.

Referring now to FIG. 2, a dither matrix 53 and an ink reduction matrix 61 used by the computer system 10 to provide printer signals used by printer 48 to generate a half tone image 54 from a source image 55 is shown. The halftone image 54, the source image 55 and the dither matrix 53 each occupy an area. For example, the dither matrix represents a physical area 56. The three areas are substantially equal to each other. Typically, the size of the area represented by the dither matrix 53 is relatively small, for example, 0.5 cm by 0.5 cm. The source image 55 is typically larger in size than the dither matrix 53. The dither matrix 53 is thus replicated to cover the area of the source image 55.

Both the halftone image 54 and the source image 55 have many pixels such as the source image pixel 57 and the halftone image pixel 58. Each pixel has a value. For example, the source image pixel 57 has a value of 100 and the halftone image pixel 58 has a value of zero. The dither matrix 53 has many matrix elements, for example, element 59 which has a value of 150. In one preferred embodiment, the dither matrix 53 has 128 rows and 128 columns of matrix elements. Thus, each element in the dither matrix 53 has a value and occupies a position in the dither matrix. For example, element 59 has a value of 150 and occupies a position 60 which corresponds to the matrix element located at the intersection of the first row and first column of dither matrix 53.

Similarly, each element in the ink reduction matrix 61 has a value and occupies a position in the ink reduction matrix 61. For example, element 62 has a value of 125 and occupies a position 63 which corresponds to the matrix element locator at the intersection of the first row and first column of ink reduction matrix 61.

Both the source image 55 and halftone image 54 may be in black and white or color. One preferred way to represent color is to have three symbols for each pixel each symbol having a different color.

The method of generating the halftone image 54 from the source image 55 includes the steps of identifying the color of each of the pixels in the source image 55, applying an ink duty limit to each of the pixels and comparing the value of each pixel in the source image 55 with the value of a corresponding element in the dither matrix 53. Based on the result of the comparison, the value of a corresponding pixel of a halftone image is determined.

Depending upon the ink duty of the ink to be applied to generate the halftone image, the values in the dither matrix 53 are assigned one of a plurality of values. In accordance with one aspect of the present invention, when the ink duty to be used to generate the halftone image is relatively high, e.g. greater than about 50%, then the values of the matrix elements in dither matrix 53 may be assigned values in accordance with any technique well-known to the use of ordinary skill in the art. However, for a pixel to be included in the halftone image 54, the value of the pixel must be greater than the value of the corresponding matrix element in the dither matrix and, additionally, the product of a reduction rate for that pixel and a value which corresponds to a 100% ink duty limit must be greater than or equal to a value of a corresponding element in the ink reduction matrix 61. If this additional condition is not met, the pixel is not included in the halftone image 54. Thus, the ink reduction matrix 61 defines ink reduction regions in the dither matrix 53.

The ink reduction regions of the dither matrix 53 define areas of the halftone image 54 in which no ink will be printed under any circumstances. This technique is described in detail in copending patent application entitled CLUSTER DITHER INK DUTY LIMIT CONTROL having named inventors Jamie Li and Dr. Joseph Shu and identified as attorney docket number AP030 filed on even date herewith and assigned to the assignee of the present invention and incorporated herein by reference.

If, on the other hand, the ink duty used to generate the halftone image is relatively low e.g. in the range of 0% ink duty to about 25% ink duty, then the values of the matrix elements in dither matrix 53 may be selected as described below in conjunction with FIGS. 3 and 4.

Referring now to FIGS. 3–3F, a portion of a dither matrix 70 includes first and second matrix portions 72, 74. In this particular example, matrix portion 72 corresponds to a first 4×4 array of matrix values and matrix portion 74 corresponds to a second 4×4 array of matrix values. The dither matrix values in the first and second portions 72, 74 of dither matrix 70 form respective ones of first and second dot patterns generated by a printer to form a portion of an image.

The values in the first portion 72 of the dither matrix 70 form complementary diagonal grids. For example, considering matrix elements 1–8 as a first layer of the dither matrix 70 and matrix elements 9–16 as a second layer of the dither matrix 70, matrix elements 1, 2, 4 and 7 form a first diagonal path, matrix elements 3 and 8 form a second diagonal path and matrix elements 5 and 6 form a third diagonal path in the first portion 72 of the dither matrix 70.

Likewise, matrix elements 9, 10 and 12 form a fourth diagonal path and matrix elements 13, 14 and 16 form a fifth diagonal path in the first portion 72 of dither matrix 70. It should be noted that the layers form complementary diagonal patterns. For example, the diagonal paths formed by matrix elements 1–8 are complementary to the diagonal paths formed by matrix elements 9–16.

With this particular pattern within a clustered-dot dither matrix, a reduction in over inking at localized regions of a recording medium are provided. This is especially useful in printing images having regions with an ink duty in the range of 0% to about 25%.

Specifically, when a region of an image is to be printed and that image includes colors which will be printed with an ink duty in the range of 0% to about 25%, the printer locates the dots in the positions defined by the matrix elements 1–8 of the clustered-dot dither matrix 70. For example, if the portion of a source image to which dither matrix 70 is to be applied includes source image pixels all having values less than or equal to 5, then the dot pattern 75 resultant from dots 75a–75e as illustrated in FIG. 3A would result from a comparison of the pixels in the source image to the values of the corresponding elements of the dither matrix 70. As can be seen in FIG. 3A dot pattern 75 results from dots 75a–75e which lie on matrix elements 1–5 of matrix 70.

The second layer of the clustered-dot dither matrix (matrix elements 9–16) are used when printing with ink duty limits in the range of about 25% to about 50%. The second layer of the clustered-dot dither matrix forms a layer having diagonal paths which are complementary to the first layer of the clustered-dot dither matrix 70. A third layer of the clustered-dot dither matrix 70 (elements 17–32) corresponds to positions in a conventional clustered-dot dither matrix and are used to provide ink duties in the range of about 50% to 100%.

In FIG. 3, when the first and second layers of the clustered-dot dither matrix are filled, (i.e. matrix elements 1–16 each have a dot positioned thereover), local regions of over inking may still occur due to an excess amount of ink being applied to a localized region of the image. Thus, while the ink duty limit for an image region may not be exceeded, the ink duty limit may be exceeded in local regions of an image. By using the dither matrix of the present invention, however, the initial printing stages of the image do not suffer from the local over inking effect.

Thus, with the technique of the present invention, when printing with ink duties in the range of 0% to about 25%, local ink duty violations, and thus local areas of over inking, may be minimized or even avoided altogether. This is because the points in the clustered-dot dither matrix are arranged to avoid a pattern in which four dots occur in four adjacent blocks. For example, matrix elements 1 and 13 represent two adjacent blocks (i.e. blocks which share at least one side) while matrix elements 1, 2, 9 and 13 represent four adjacent blocks. In contrast matrix elements 1–8 do not share any sides.

In regions of an image in which the printer prints with a relatively high ink duty, such as region 74 (FIG. 3) the punch out hole technique described in the aforementioned copending patent application entitled CLUSTER DITHER INK DUTY LIMIT CONTROL may be used. This techniques minimizes local over inking in image regions having a relatively high ink duty.

The technique of the present invention thus minimizes and in some cases totally avoids the occurrences of local over inking in image regions having an ink duty in the range of 0% to about 25%. Furthermore, with the technique of the present invention, image variations due to registration error result in fewer tonal changes in the image. It should be noted that although this technique is effective at relatively low ink duties (e.g. ink duties in the range of about 0% to 25%), the technique can also be used at ink duties greater than 25%.

An image region having a relatively low ink duty, should ideally appear relatively smooth to a viewer since, at relatively low ink duties, there should be no ink duty problems such as the occurrence of placing too much ink on a recording media. In practice, however, ink duty problems exist even in image regions having a relatively low ink duty. This is because of the above described local over inking which can occur when a conventional cluster dot matrix is used. Thus, from a distance, rather than having a relatively smooth appearance, an image may have a relatively noisy appearance due to the combination of the above-described over inking and banding problems.

The clustered-dot dither matrix of FIG. 3, however, produces images in which local over inking and banding pattern problems are reduced. This is especially true in those regions of an image having ink disposed at a relatively low ink duty. The selection of matrix values for the cluster matrix is thus selected to reduce or avoid ink bleeding in the initial stages of generating cluster dots.

Referring now to FIGS. 3B–3F, consecutive layers using a diagonal pattern are shown. FIG. 3B represents a first layer including matrix elements 1–4 and is used to print regions of an image having ink duties in the range of 0% to about 12.5%. FIG. 3C represents a second layer including matrix elements 5–8. The second layer of the clustered-dot dither matrix 70 is used in conjunction with the first layer to print regions of an image having ink duties in the range of about 12.5% to about 25%. FIG. 3D represents a third layer including matrix elements 9–12 and may be used in conjunction with layers one and two to print regions of an image having ink duties in the range of about 25% to about 50%. FIG. 3E represents a fourth layer including matrix elements 13–16 and may be used in conjunction with layers one, two and three to print regions of an image having ink duties in the range of about 50%.

FIG. 3F illustrates a dot pattern provided from layers 1 and 2. It should be noted that the dot pattern in FIG. 3F does not include any dots which are adjacent in either horizontal or vertical directions of the matrix. Rather, all dots are aligned along diagonal paths of the matrix.

Referring now to FIG. 4, a clustered-dot dither matrix 80 includes a first matrix portion 82 and a second matrix portion 84. IN this particular example, matrix portion 82 corresponds to a first 4×4 array of matrix values and matrix position 84 corresponds to a second 4×4 array of matrix values.

The first matrix portion 82 is subdivided into four layers. The first layer includes matrix elements 1–4 and is used to print regions of an image having ink duties in the range of 0% to about 12.5%. The second layer of the clustered-dot dither matrix 80 includes matrix elements 5–8 and is used in conjunction with the first layer to print regions of an image having ink duties in the range of about 12.5% to about 25%. The third layer of the clustered-dot dither matrix 80 includes matrix elements 9-16 and is used in conjunction with layers one and two to print regions of an image having ink duties in the range of about 25% to about 50%. The fourth layer of the clustered-dot dither matrix 80 includes matrix elements 17-32 and is used in conjunction with layers one, two and three to print regions of an image having ink duties in the range of about 50% to 100%.

In some printing applications it may desirable to use the clustered-dot dither matrix of FIG. 3 while in other printing applications it may be desirable to use the clustered-dot dither matrix of FIG. 4. The decision to use a particular clustered-dot dither matrix is based upon a variety of factors including but not limited to the paper type and the printed dot size. For example, if glossy paper or film is used as the recording media, the it may be desirable to use the clustered-dot matrix of FIG. 4.

On the other hand, if a printer uses a relatively small dot size such that little or no local over inking occurs between adjacent dots such as dots positioned at matrix elements 1 and 2 of dither matrix 70 (FIG. 3), then the clustered-dot dither matrix of FIG. 3 may be used since little or no local over inking will occur due to the dot size. Conversely, if the printer dot size is relatively large such that local over inking occurs due to the application of adjacent dots on a recording media, then it may be desirable to use the clustered-dot dither matrix of FIG. 4.

It should be noted that while diagonally neighboring matrix elements in the clustered-dot dither matrix 70 described above in conjunction with FIG. 3 results in minimize local over inking when printing images, even this technique, in some instances may violate local ink duty limits. Thus, in the dither matrix 80 shown in FIG. 4, one matrix element of the portion 82 of the dither matrix 80 is always skipped in both horizontal and vertical directions.

Consequently, when printing with ink duties in the range of 0%–12.5% and using the first dither matrix layer, every other matrix element in both horizontal and vertical directions is not used (i.e. no ink is applied to the recording media in those regions). The second dither matrix layer is generated by moving to the next diagonally closest cell position and again not using one horizontal and one vertical cell for ink duties in the range of 12.5% to 25%.

As indicated heretofore, aspects of this invention pertain to specific "method functions" implementable on computer systems. Those skilled in the art should readily appreciate that programs defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. An apparatus for generating a halftone image from a source image represented as an array of pixels, each of the pixels having a value stored in a source image memory, the apparatus comprising:

a threshold value memory having a first array of clustered-dot dither matrix threshold values stored therein, the matrix threshold values grouped into a plurality of layers, each of the layers arranged to form complementary diagonal patterns within the first array of matrix threshold values, such that a first layer of threshold values defines a first outwardly spiraling clustered-dot growing sequence and a second layer of threshold values defines a second outwardly spiraling clustered-dot growing sequence that is complementary to the first outwardly spiraling clustered-dot growing sequence;

a comparator, coupled to the source image memory and said. threshold value memory, said comparator to compare each of the pixel values stored in the source image memory with a corresponding one of the threshold values stored in said threshold value memory; and a halftone image generator to construct a pattern of dots having a predetermined color, wherein each of the dots are arranged in a pattern defined by the values in said threshold value memory.

2. The apparatus of claim 1 wherein said threshold value memory has a second array of the threshold values stored therein, the second array of threshold values having a pattern corresponding to a spiral which expands outward from an initial point.

3. The apparatus of claim 2 wherein each of the dots are the same size.

4. The apparatus of claim 3 wherein a first one of the plurality of layers is offset from a second one of the plurality of layers by a predetermined amount and in a predetermined direction.

5. The apparatus of claim 4 wherein a first one of the plurality of layers is offset from a second one of the plurality of layers by one cell in a diagonal direction.

6. A method of producing a halftone image from a digital data file comprising the steps of:

generating a pattern of dots for each of a plurality of colors wherein the pattern of dots varies as a function of the input density of each of the plurality of colors, said generating step including the steps of:

generating a first layer of a clustered-dot dither matrix, the first layer forming a first pattern of the clustered-dot dither matrix; and generating a second layer of said clustered-dot dither matrix, the second layer generating a second pattern in the clustered-dot dither matrix wherein the first and second layers form complementary diagonal patterns, such that the first pattern formed by the first layer is a first outwardly spiraling clustered-dot growing sequence and the second pattern formed by the second layer is a second outwardly spiraling clustered-dot growing sequence that is complementary to the first outwardly spiraling clustered-dot growing sequence.

7. The method of claim 6 further comprising the steps of determining the ink duty of an image region; and printing dots in a first layer of the clustered-dot dither matrix.

8. The method of claim 7 further comprising the steps of printing dots in a second layer of the clustered-dot dither matrix.

9. An apparatus for generating a halftone image from a source image represented as an array of pixels, each of the pixels having a value stored in a source image memory, the apparatus comprising:

a threshold value memory having a first array of matrix threshold values stored therein, the matrix threshold values grouped into a plurality of layers, each of the layers arranged to form complementary diagonal block patterns within the first array of matrix threshold values, such that a first layer of threshold values defines a first outwardly spiraling clustered-dot growing sequence and a second layer of threshold values defines a second outwardly spiraling clustered-dot growing sequence that is complementary to the first outwardly spiraling clustered-dot growing sequence, with corresponding values in each layer spaced by at least one cell of the first array;

a comparator, coupled to the source image memory and said threshold value memory, said comparator to compare each of the pixel values stored in the source image memory with a corresponding one of the threshold values stored in said threshold value memory; and a halftone image generator to construct a pattern of dots having a predetermined color, wherein each of the dots are arranged in a pattern defined by the values in said threshold value memory.

10. The apparatus of claim 9 wherein said threshold value memory has a second array of the threshold values stored therein array, the second array of threshold values having a pattern corresponding to a spiral which expands outward from an initial point.

11. The apparatus of claim 10 wherein each of the dots are the same size.

12. The apparatus of claim 11 wherein a first one of the plurality of layers is offset from a second one of the plurality of layers by a predetermined amount and in a predetermined direction.

13. The apparatus of claim 12 wherein a first one of the plurality of layers is offset from a second one of the plurality of layers by one cell in a diagonal direction.

14. A method of producing a halftone image from a digital data file comprising the steps of:

generating a pattern of dots for each of a plurality of colors wherein the pattern of dots varies as a function of the input density of each of the plurality of colors, said generating step including the steps of:
generating a first layer of a clustered-dot dither matrix, the first layer forming a first rectangular pattern of the clustered-dot dither matrix; and
generating a second layer of said clustered-dot dither matrix, the second layer generating a second rectangular pattern in the clustered-dot dither matrix and wherein the first and second layers form complementary diagonal patterns, such that the first rectangular pattern formed by the first layer is a first outwardly spiraling clustered-dot growing sequence and the second rectangular pattern formed by the second layer is a second outwardly spiraling clustered-dot growing sequence that is complementary to the first outwardly spiraling clustered-dot growing sequence.

15. The method of claim 14 further comprising the steps of determining the ink duty of an image region; and
printing dots in a first layer of the clustered-dot dither matrix.

16. The method of claim 15 further comprising the steps of printing dots in a second layer of the clustered-dot dither matrix.

17. A computer program product for producing a halftone image from a digital data file, wherein the halftone image is printed on a recording media, the computer program product comprising:

a computer usable medium having computer readable program code to generate a pattern of dots for each of a plurality of colors wherein the pattern of dots varies as a function of the input density of each of the plurality of colors;

a computer usable medium having a clustered-dot dither matrix stored thereon, the clustered-dot dither matrix having a plurality of matrix cells with first ones of the plurality of matrix cells forming a first layer of the clustered-dot dither matrix and second ones of the plurality of matrix cells forming a second layer of the clustered-dot dither matrix and wherein the first and second layers form complementary diagonal patterns, such that the first layer forms a first outwardly spiraling clustered-dot growing sequence and the second layer forms a second outwardly spiraling clustered-dot growing sequence that is complementary to the first outwardly spiraling clustered-dot growing sequence;

a computer usable medium having computer readable program code to compare values from the digital data file to values of corresponding matrix cells in the first layer of the clustered-dot dither matrix; and a computer usable medium having computer readable program code to compare values from the digital data file to values of corresponding matrix cells in the second layer of the clustered-dot dither matrix.

18. The computer program product of claim 17 further comprising a computer usable medium having computer readable program code to print dots in a pattern represented by the first layer of the clustered-dot dither matrix.

19. The computer program product of claim 18 further comprising a computer usable medium having computer readable program code to print dots on a recording medium in a pattern represented by the second layer of the clustered-dot dither matrix.

20. A computer program product for producing a halftone image from a digital data file, wherein the halftone image is printed on a recording media, the computer program product comprising:

a computer usable medium having computer readable program code to generate a pattern of dots for each of a plurality of colors wherein the pattern of dots varies as a function of the input density of each of the plurality of colors;

a computer usable medium having a clustered-dot dither matrix stored thereon, the clustered-dot dither matrix having a plurality of matrix cells with first ones of the plurality of matrix cells forming a first layer of the clustered-dot dither matrix and second ones of the plurality of matrix cells forming a second layer of the clustered-dot dither matrix and wherein the first and second layers form complementary diagonal patterns, such that the first layer forms a first outwardly spiraling clustered-dot growing sequence and the second layer forms a second outwardly spiraling clustered-dot growing sequence that is complementary to the first outwardly spiraling clustered-dot growing sequence and wherein each of the matrix cells of the first layer are spaced apart by at least one cell in one of a horizontal and vertical direction and wherein each of the matrix cells of the second layer are spaced apart by at least one cell in one of a horizontal and vertical direction and wherein a matrix cell of the first layer is adjacent at least one matrix cell in the second layer;

a computer usable medium having computer readable program code to compare values from the digital data file to values of corresponding matrix cells in the first layer of the clustered-dot dither matrix; and a computer usable medium having computer readable program code to compare values from the digital data file to values of corresponding matrix cells in the second layer of the clustered-dot dither matrix.

21. The computer program product of claim 20 further comprising a computer usable medium having computer readable program code to print dots on a recording medium in a pattern represented by matrix cell positions in the first layer of the clustered-dot dither matrix.

22. The computer program product of claim 21 further comprising a computer usable medium having computer readable program code to print dots in positions on a recording medium in a pattern represented by matrix cell positions in the second layer of the clustered-dot dither matrix.

* * * * *

UNITED STATES PATENT AND TRADEMARK OFFICE
CERTIFICATE OF CORRECTION

PATENT NO. : 5,920,682
DATED : July 06, 1999
INVENTOR(S) : Joseph Shu, et al.

It is certified that an error appears in the above identified patent and that said Letters Patent is hereby corrected as shown below:

Column 12, line 16, delete "," after "said".

Signed and Sealed this

Thirtieth Day of November, 1999

Q. TODD DICKINSON

Attest:

*Attesting Officer*            *Acting Commissioner of Patents and Trademarks*